Patented Nov. 25, 1930

1,782,693

UNITED STATES PATENT OFFICE

STUART P. MILLER, OF PHILADELPHIA, PENNSYLVANIA, ASSIGNOR TO THE BARRETT COMPANY, A CORPORATION OF NEW JERSEY

SULPHUR AND RESIN COMPOUND

No Drawing.   Application filed December 2, 1924.   Serial No. 753,476.

This invention relates to a new and useful composition of matter and to the process of making and using the same. It relates more particularly to dissolving sulphur in a certain kind of resin and the process of compounding rubber in which the product of this invention is used.

In carrying out this invention I preferably use so-called paracoumaron resin or "cumar" which is obtained for example by polymerizing the polymerizable constituents in solvent naphtha. This sort of resin has been used heretofore for compounding rubber but has been found to be objectionable at times because certain grades of it after being milled into the rubber cause the sulphur to appear upon the surface of the rubber stock as a "bloom" after the unvulcanized product has been permitted to age for the usual length of time.

I have found that sulphur is soluble to a considerable extent in paracoumaron resin by merely melting the resin and stirring the sulphur therein. It is possible to dissolve in this manner 15% or 20% or more by weight of sulphur in the resin, depending to some extent upon the melting point or grade of the resin used.

It has been found that when a certain amount of sulphur has been dissolved in paracoumaron resin the properties of the resin are greatly improved so as to make it better adapted as an agent to be used in rubber compounding. In this way its tendency to cause "blooming" is greatly minimized or entirely overcome, thus making the resin much more suitable for this purpose.

Heretofore, samples of cumar have been taken from supplies that were intended to be used in rubber compounding and small amounts were tested by making up rubber compounds with the resin therein and waiting for the proper length of time to see whether the resin being tested would cause the sulphur to appear upon the surface during the ageing process before vulcanization. Batches of cumar found to be unsuitable for rubber compounding were discarded for this purpose as no way has been known hitherto to change this sort of cumar after it has been produced so as to render it fit for rubber compounding.

By the present invention batches or grades of cumar otherwise not adaptable for this purpose may be utilized with safety and with satisfactory results.

As a specific illustration of the invention I give the following example without intending to limit the invention to the particular proportions stated or to the particular grade or melting point of cumar mentioned:—

About 10% by weight of sulphur is dissolved in cumar of melting point between 78° C. and 95° C. About 9 parts by weight of the cumar containing sulphur in solution are milled into about 60 parts of unvulcanized rubber, 31 parts of sulphur and 2 parts of gas black or carbon black and the compound is allowed to age for about 72 hours. The cumar does not cause any objectionable "blooming" of the unvulcanized stock in the above period. The composition of cumar and sulphur may be then treated in the usual way to vulcanize it, with or without the addition of the usual fillers such as zinc oxide, for example, as desired.

I claim:

1. A composition of matter for compounding rubber which comprises paracoumaron resin having a melting point between 78° C. and 95° C. and sulphur.

2. A composition of matter for compounding rubber which comprises paracoumaron resin and sulphur in the proportion by weight of about 1 part of sulphur to 10 parts of resin having a melting point between 78° C. and 95° C.

3. A composition of matter for compounding rubber which comprises paracoumaron resin and sulphur in the proportion by weight of from 10 to 20 parts of sulphur to 100 parts of resin having a melting point between 78° C. and 95° C.

4. The process of rubber compounding which comprises melting paracoumaron resin adding sulphur thereto and mixing the resulting solution with rubber.

5. The process of rubber compounding which comprises melting paracoumaron resin, dissolving in said resin 10% by weight of sulphur and mixing the resulting solution with rubber.

6. The process of rubber compounding which comprises melting paracoumaron resin having a melting point between 78° C. and 95° C., dissolving in said resin from 10 to 20% by weight of sulphur and mixing the resulting solution with rubber.

7. In the process of preventing "blooming" of rubber compositions, the step which includes forming a solution of paracoumaron resin and sulphur and mixing the resultant solution with rubber.

In testimony whereof I affix my signature.

STUART P. MILLER.